(12) United States Patent
Nikol (10) Patent No.: US 10,782,439 B2
(45) Date of Patent: Sep. 22, 2020

(54) CORRECTION OF X-RAY IMAGES

(71) Applicant: Smiths Heimann GmbH, Wiesbaden (DE)

(72) Inventor: Peter Nikol, Taunusstein (DE)

(73) Assignee: SMITHS HEIMANN GMBH, Wiesbaden (DE)

(*) Notice: Subject to any disclaimer, the term of this patent is extended or adjusted under 35 U.S.C. 154(b) by 175 days.

(21) Appl. No.: 15/576,134

(22) PCT Filed: May 11, 2016

(86) PCT No.: PCT/EP2016/060530
§ 371 (c)(1),
(2) Date: Nov. 21, 2017

(87) PCT Pub. No.: WO2016/188749
PCT Pub. Date: Dec. 1, 2016

(65) Prior Publication Data
US 2018/0164467 A1    Jun. 14, 2018

(30) Foreign Application Priority Data

May 22, 2015  (DE) ........................ 10 2015 108 128

(51) Int. Cl.
| | |
|---|---|
| *G01V 5/00* | (2006.01) |
| *G06T 7/00* | (2017.01) |
| *G06T 5/50* | (2006.01) |

(52) U.S. Cl.
CPC ............ *G01V 5/0016* (2013.01); *G01V 5/005* (2013.01); *G06T 5/50* (2013.01); *G06T 7/0004* (2013.01);
(Continued)

(58) Field of Classification Search
None
See application file for complete search history.

(56) References Cited

U.S. PATENT DOCUMENTS

2005/0195939 A1   9/2005  Scheinman et al.
2005/0276468 A1   12/2005  Ying et al.
(Continued)

FOREIGN PATENT DOCUMENTS

| EP | 0336634 A1 | 10/1989 |
| WO | 2011130845 A1 | 10/2011 |
| WO | 2013142072 A2 | 9/2013 |

OTHER PUBLICATIONS

International Search Report and Written Opinion dated Aug. 9, 2016 for PCT/EP2016/060530.

*Primary Examiner* — Hoon K Song
(74) *Attorney, Agent, or Firm* — Kevin E. West; Advent, LLP (57) ABSTRACT

Methods, systems, and devices are described for correcting image errors in a radiographic image that has been generated by means of an inspection apparatus configured for continuously transporting inspection objects through the inspection apparatus for the nondestructive inspection of the inspection objects and to generate radiographic images of the inspection objects. An inspection system includes an evaluation device connected in a spatially separate manner to one or more inspection apparatuses. The evaluation device includes a computer unit configured to receive at least one radiographic image of an inspection object from generated by the inspection apparatus, an output unit for displaying the radiographic images, and an input unit for receiving inputs from an operator in response to the displayed radiographic images. The disclosure further relates to a corresponding computer program, a data medium, and a data stream.

20 Claims, 4 Drawing Sheets

(52) U.S. Cl.
CPC ............... *G06T 2207/10116* (2013.01); *G06T 2207/20221* (2013.01); *G06T 2207/30112* (2013.01); *G06T 2207/30168* (2013.01)

(56) References Cited

U.S. PATENT DOCUMENTS

| | | |
|---|---|---|
| 2008/0044801 A1* | 2/2008 | Modica ............ G06Q 10/06398 434/307 R |
| 2009/0136089 A1 | 5/2009 | Singh |
| 2009/0232348 A1 | 9/2009 | Abraham et al. |
| 2010/0183209 A1 | 7/2010 | Litvin et al. |
| 2011/0170661 A1 | 7/2011 | Bueno et al. |
| 2011/0188726 A1 | 8/2011 | Nathaniel et al. |

* cited by examiner

CORRECTION OF X-RAY IMAGES

The present disclosure relates in general to the field of visual nondestructive inspection of objects by means of imaging methods, for example at transitions to areas having increased security requirements. In particular, the disclosure relates to options for correcting certain errors in radiographic images of the objects to be able to avoid conducting a new X-ray of one or more inspection objects, which is currently necessary.

BACKGROUND

X-ray inspection systems can have multiple radiation planes for the nondestructive inspection of objects. This type of inspection may take place, for example, within the scope of a security screening of baggage items at airports. During the inspection, an inspection object is conveyed through the multiple X-ray levels and thus X-rayed. The intensities of the X-rays that are not absorbed by the inspection object and its contents are measured by appropriate detector systems. The measured intensity values are evaluated and used, among other things, for generating one or more X-ray images of the inspection object. The X-ray images are displayed to an operator on a screen for visual examination of the contents of the inspection object. The visual inspection of inspection objects by means of an imaging method is generally time-consuming, so that efforts are continually being made to improve and optimize the method and its individual method steps.

During the generation of X-ray images of inspection objects, for example at control points at which a plurality of inspection objects is continuously examined, image errors may occur which make it necessary to conduct a new X-ray of one or more inspection objects. In a first scenario, an inspection object is not completely contained in the X-ray image displayed to the operator. That is, the inspection object was cut off, as the result of which the operator cannot completely visually examine the inspection object. In a second scenario, multiple inspection objects have been captured, i.e., contained, in a single X-ray image. The result of the visual evaluation for an inspection object is generally associated with the particular X-ray image. When there are multiple inspection objects in the X-ray image, this is not unequivocal. Therefore, in both scenarios an operator or evaluation person must reject the X-ray images. The inspection objects in question must then be X-rayed again or manually rechecked. This entails an extra level of effort for the control point(s) in question, and may result in additional delays in processing the inspection objects at the control point(s).

A registered overlapping of various output X-ray images of the same inspection object can be performed, each of which has been detected by means of associated detectors having different imaging characteristics, in order to obtain a resulting X-ray image with an improved signal-to-noise ratio compared to the output X-ray images. Further, multiple partial X-ray images of a body part (the femur, for example) can be combined in order to generate a panoramic X-ray image of the entire body part. For combining the partial X-ray images, during their generation, reference markers are also recorded, on which areas of the partial X-ray images based thereon and having overlapping content may be aligned in register with the panoramic X-ray image and thus congruently combined. These methods are not suitable for solving the problem described at the outset.

SUMMARY

An improved inspection method or inspection system is provided, in which in particular conducting a new X-ray or manually rechecking of one or more inspection objects, which is currently necessary, may be avoided.

In this regard, features and particulars that are described in conjunction with the device according to the disclosure naturally also apply in conjunction with the method according to the disclosure, and vice versa. Therefore, mutual reference is made with regard to the disclosure of the individual aspects.

A core concept of the disclosure lies in recognizing a faulty radiographic image and correcting it, taking into account the type of error in the faulty radiographic image, optionally using further radiographic images. Thus, depending on the organizational process of the screening of inspection objects, such as baggage screening, the situation may be avoided that an inspection object must be X-rayed again and/or manually rechecked. Both measures are time-consuming, and may delay the process.

A first aspect of the disclosure relates to a method for correcting image errors in a radiographic image. The radiographic image has been generated by means of an inspection apparatus that is configured for continuously transporting inspection objects through the inspection apparatus in order to carry out an imaging inspection method for the nondestructive inspection of the inspection objects and to generate radiographic images of the inspection objects. According to the disclosure, the method has the following steps:

step (a) receiving a radiographic image;

step (b) recognizing whether the radiographic image contains only a portion of an inspection object;

step (c) if the radiographic image contains only a portion of an inspection object, retrieving a further radiographic image that has been generated using the inspection apparatus and that contains a further portion of the inspection object; and step (d) combining the radiographic image with the further radiographic image to form a combined radiographic image.

A preceding radiographic image and/or subsequent radiographic image may be retrieved in step (c), based on which image edge of the radiographic image intersects the inspection object. Since the radiographic images at an inspection apparatus are prepared from inspection objects that are continuously transported through the inspection apparatus, it may be determined, based on whether an inspection object is intersected by the leading and/or the trailing image edge of the radiographic image, or whether the inspection object is situated on the leading and/or the trailing image edge of the radiographic image, whether a preceding or a subsequent radiographic image is needed to complete the inspection object. In principle, it is also possible that an inspection object has been cut off on two sides, in which case the preceding radiographic image and the subsequent radiographic image are needed.

After step (d) the method may also include: returning to step (a) if the radiographic image has been combined with a further radiographic image in step (d). It may thus be ensured that an inspection object in the combined radiographic image is in fact completely detected.

In one further development, according to a second aspect of the disclosure the method alternatively or additionally has the following steps:

step (e) recognizing whether the radiographic image or optionally the combined radiographic image contains multiple inspection objects;

step (f) if the radiographic image or optionally the combined radiographic image contains multiple inspection objects, dividing the radiographic image or optionally the combined radiographic image, and generating resulting radiographic images, each of which contains only one of the multiple inspection objects.

It is noted that the methods may be independently implemented according to either the first or the second aspect, or used in combination with one another in succession. In principle, it is also possible for the method according to the second aspect to be carried out first, followed by the method according to the first aspect, although only the sequence above is described.

Lastly, a method according to the first and/or the second aspect may also include:

step (g) displaying (S9) the radiographic image or optionally the combined radiographic image (B23) or optionally the resulting radiographic images (B1-1, B1-2) to an operator for visual evaluation and/or storing of the radiographic image or optionally the combined radiographic image (B23) or optionally the resulting radiographic images (B1-1, B1-2).

In step (b) and/or in step (e) the method may be configured in such a way that it is automatically recognized whether a radiographic image contains multiple inspection objects and/or whether a radiographic image contains an incompletely captured inspection object. Additionally or alternatively, a request for an input from an operator may be made in such a way that the input indicates whether the radiographic image contains multiple inspection objects and/or whether a radiographic image contains an incompletely captured inspection object. In the alternative variant, an operator recognizes relatively quickly whether one of the described image errors is present. After a determination is made by the operator, the correction according to the disclosure of the radiographic images in question may take place.

In one particular embodiment, the following may be provided in a step (f):

defining, in particular by placing a marker in the radiographic image or optionally the combined radiographic image, a separation curve, in particular a separating line, along which the radiographic image or optionally the combined radiographic image is to be divided into resulting radiographic images, each of which contains only one of the multiple inspection objects.

A third aspect of the disclosure relates to an evaluation device for visually evaluating radiographic images. The evaluation device has at least one computer unit, an input unit, and an output unit. The output unit is preferably configured for displaying radiographic images of inspection objects to an operator. The output unit may be any given computer display or screen. Within the scope of the disclosure, the input unit is configured, among other things, for receiving inputs from the operator in response to a displayed radiographic image. According to the disclosure, the computer unit is configured for carrying out a method according to the first and/or second aspect of the disclosure, for example by appropriate programming via software means.

The computer unit may also have a communication interface. The communication interface may be configured for a wireless communication link, for example WLAN, Bluetooth, ZigBee, etc., or a wired communication link, for example via network cable, Ethernet over powerline, etc. Via the communication interface, for a data communication the computer unit is interconnectable with one or more inspection appartuses for the nondestructive inspection of inspection objects, in order to receive from the one or more inspection appartuses radiographic images for the visual evaluation, by means of the data communication.

A fourth aspect of the disclosure relates to an inspection apparatus that is configured for continuously transporting inspection objects through the inspection apparatus in order to carry out an imaging inspection method for the nondestructive inspection of the inspection objects and to provide radiographic images of the inspection objects, and according to the third aspect, the inspection apparatus is connected to at least one evaluation device for a data communication, in particular for transmitting radiographic images.

A fifth aspect of the disclosure relates to an inspection system having at least one evaluation device according to the third aspect, which is connected in a spatially separate manner to one or more inspection appartuses according to the fourth aspect for a data communication. Radiographic images of inspection objects that are inspected at the one or more inspection appartuses may thus be transmitted to the at least one evaluation device for a visual evaluation.

A sixth aspect of the disclosure relates to a computer program product having a computer program which includes software means for carrying out a method according to the first and/or the second aspect when the computer program is executed on a computer.

A seventh aspect of the disclosure relates to a data medium having a computer program product according to the sixth aspect.

An eighth aspect of the disclosure relates to a data stream containing electronically readable control signals that are able to interact with a programmable computer in such a way that the computer carries out a method according to the first or the second aspect.

Waiting lines and corresponding wait times at control points may be reduced by use of the approach according to the disclosure. A reduction of the wait time generally promotes acceptance of the security methods. In addition, reducing the length of the waiting line also decreases the space required for a control point. Moreover, reducing the length of the waiting line also has a positive effect on the security personnel at such a control point, since the mental stress is likewise reduced.

DRAWINGS

Further advantages, features, and particulars of the disclosure result from the following description, in which exemplary embodiments of the disclosure are described in detail with reference to the drawings. The features mentioned in the claims and in the description may in each case be essential to the disclosure, alone or in any combination. Likewise, the features described above and to be further explained below may each be used individually or collectively in any combination. Functionally equivalent or identical parts or components are sometimes provided with the same reference numerals. The terms "left," "right," "top," and "bottom" used in the description of the exemplary embodiments refer to the drawings in an orientation in which the figure text or reference numerals are normally readable. The embodiments shown and described are not to be construed as an exhaustive listing, but, rather, are exemplary in nature for describing the disclosure. The detailed description is used for the information of those skilled in the art; therefore, known circuits, structures, and methods are not described or explained in detail in the description in order to not complicate understanding of the present description.

DETAILED DESCRIPTION

Figure 1:
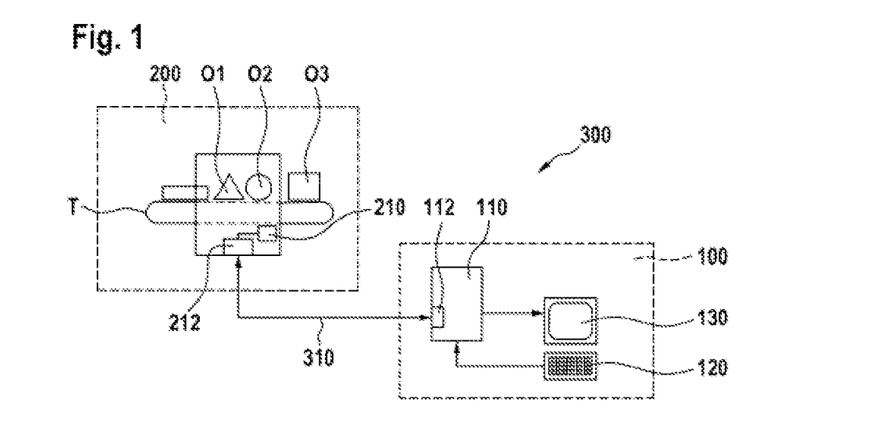
FIG. 1 shows an inspection system having an evaluation device that is connected to an inspection apparatus via a network connection.

FIG. 1 shows a simplified block diagram of an inspection system 300, having an evaluation device 100 for visually evaluating radiographic images B1, B2, B3 (FIG. 2) of inspection objects O1, O2, O3. The evaluation device 100 essentially has a computer unit 110, an input unit 120, and an output unit 130 as a workstation for an operator.

Figure 2:
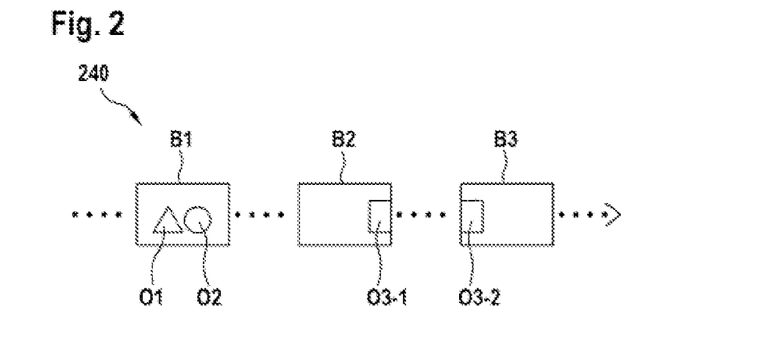
FIG. 2 schematically illustrates a sequence of radiographic images of inspection objects that have been generated using the inspection apparatus in FIG. 1.

The output unit 130 is configured for displaying to the operator the radiographic images B1, B2, B3 of the inspection objects O1, O2, O3 in order to examine the contents of the inspection objects for target items. Target items may be dangerous objects such as weapons, explosives, hazardous liquids, and/or smuggled goods and/or drugs, etc. The input unit 120 is essentially configured for inputting inputs from the operator for controlling the evaluation device 100. In addition, in response to a displayed radiographic image B1, B2, B3, the operator may input the result of the visual evaluation, for example that the inspection object O1, O2, O3 is "safe," or that the contents of the inspection object O1, O2, O3 must be further examined.

In conjunction with the improvement proposed here, the operator at the input unit 120 may also indicate or signal to the evaluation device 100 that the displayed radiographic image B1, B2, B3 contains a possibly correctable image error, namely, that the radiographic image B1 contains multiple inspection objects O1 and O2, or that the radiographic image B2 or B3 contains only a portion O3-1 or O3-2 of an inspection object O3. For these cases, the computer unit 110 is configured for carrying out one of the methods proposed here for correcting image errors in a radiographic image B1, B2, B3.

The radiographic images have been generated by means of the inspection apparatus 200. The inspection apparatus 200 may essentially be an X-ray inspection system as known from DE 101 49 254 A1, for example. Of course, the inspection apparatus may also be an X-ray inspection system having only one radiation plane. The inspection apparatus 200 is essentially configured for continuously transporting inspection objects O1, O2, O3 through the inspection apparatus 200 via a transport means T, for example a transport belt. In the interior of the inspection apparatus 200 the inspection objects O1, O2, O3 are nondestructively irradiated with X-rays in a known manner by means of an imaging inspection method. As a result, the inspection apparatus 200 generates radiographic images of the inspection objects O1, O2, O3.

In the exemplary embodiment of the inspection system 300 in FIG. 1, the evaluation device 100 is connected in a spatially separate manner to the inspection apparatuses 200 via a network connection 310 for a data communication. For this purpose, the computer unit 110 has a communication interface 112 by means of which the computer unit 110 is interconnected, via the network connection 310 for the data communication, to one or more inspection apparatuses 200 for the nondestructive inspection of the inspection objects O1, O2, O3. Generated radiographic images of inspection objects O1, O2, O3 that are inspected at the inspection apparatus 200 may be transmitted via the network connection 310 for visual evaluation at the evaluation device 100. Of course, the inspection system 300 may also have multiple inspection apparatuses 200, which are interconnected with the evaluation device 100 in the same way. Likewise, the inspection system 300 may also have multiple evaluation devices 100, so that the workload during the visual evaluation of radiographic images may be optimally divided over the evaluation devices 100 that are present.

Alternatively, the evaluation device 100 may be designed to be in immediate spatial proximity to the inspection apparatus 200, or as an integral part of same.

FIG. 2 illustrates by way of example a sequence of radiographic images B1, B2, B3 on which the inspection objects O1, O2, O3 are captured, and which have been generated using, for example, the inspection apparatus 200 in FIG. 1. The radiographic images B1, B2, B3 shown are used here essentially for a simplified representation of image errors that may be corrected using the correction method described in conjunction with FIGS. 3 through 5. More than one inspection object, namely, two inspection objects O1, O2, have been captured in the radiographic image B1. Only a portion O3-1 or O3-2 of the inspection object O3 has been captured in each case in the radiographic images B2, B3.

Figure 3:
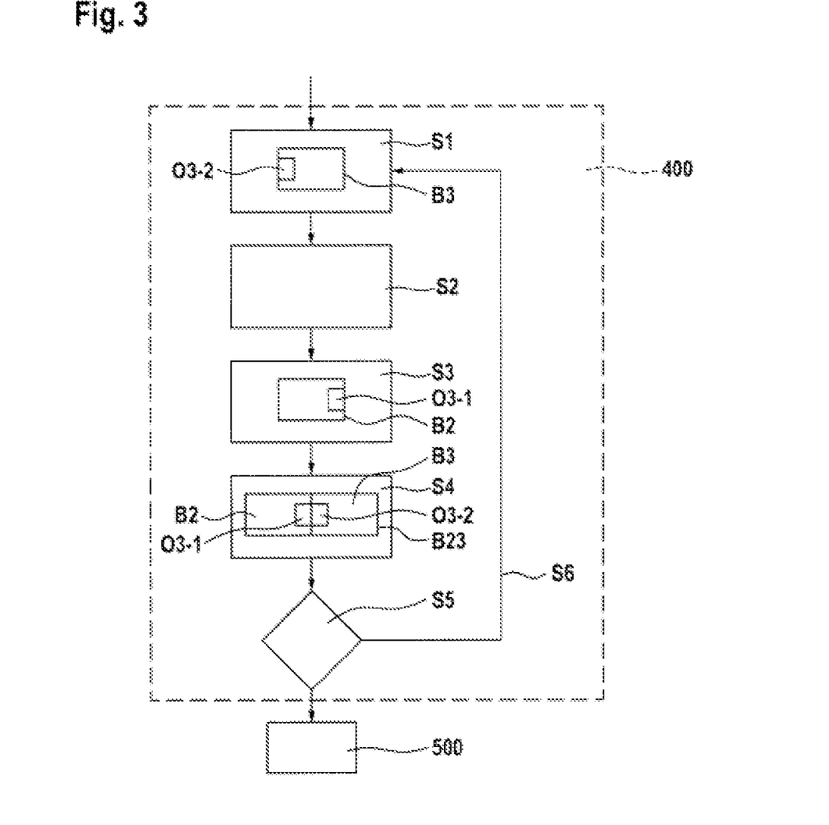
FIG. 3 illustrates a first aspect of a method for correcting image errors in a radiographic image.

FIG. 3 illustrates a first aspect of a method 400 for correcting image errors in a radiographic image B2 or B3 according to the first scenario, in which the inspection object O3 is not completely contained in the X-ray image B2 or B3 displayed to the operator. The inspection object O3 has been cut off during generation of the radiographic images B2 and B3. One portion O3-1 of the inspection object O3 is situated in the radiographic image B2, and the second portion O3-2 is situated in the radiographic image B3. As a result, the operator cannot completely visually examine the inspection object O3 in either radiographic image B2 or in radiographic image B3, and would have to reject both radiographic images B2, B3 at the evaluation device 100. The inspection object O3 in question would then have to be X-rayed again or manually rechecked, which would entail an extra level of effort at the inspection apparatus 200, which is usually situated at a control point. The continuous work flow is thus disrupted. This results in additional delays in processing at the control point, and consequently increases the length of a waiting line at that location.

To avoid these disadvantages, the method 400 illustrated in FIG. 3 is proposed, which is carried out, for example, by the computer unit 110 of the evaluation device 100 in FIG. 1.

The radiographic image B3 is received at the evaluation device 100 in step S1. In the subsequent step S2 it is first recognized whether the radiographic image B3 contains only a portion O3-2 of an inspection object O3 (also see FIGS. 1 and 2).

Since the radiographic image B3 contains only a portion O3-2 of the inspection object O3, the evaluation device 100 retrieves a further radiographic image B2 from the same inspection apparatus 200 that has generated the radiographic image B3. The further radiographic image B2 is specified due to the fact that it contains a further portion O3-1 of the inspection object O3.

Whether a preceding or a subsequent radiographic image with regard to the radiographic image B3 is to be retrieved by the same inspection apparatus 200 may be determined based on which image edge of the radiographic image B3 intersects with the inspection object O3. In the example, the trailing edge of the radiographic image B3 intersects with the inspection object O3, and therefore the subsequent radiographic image B2 is to be retrieved at the inspection apparatus 200.

The radiographic image B3 is combined with the further radiographic image B2 at the associated edges in the next step S4 to form a combined radiographic image B23. This may now be followed by a step S5 in which the method returns to step S1, since the radiographic image B3 has been combined with a further radiographic image B2 in step S5. It may thus be ensured that image errors in which portions of an inspection object are divided over more than two radiographic images are also corrected.

When the method 400 in step S5 does not return to step S1, the image error according to the first scenario has been corrected.

According to one further development, the method 400 may be continued with a further correction method for correcting image errors according to the second scenario. During the combining of radiographic images explained in conjunction with FIG. 3, multiple inspection objects may possibly be contained in the combined radiographic image B23. This is correctable with the method 500, which is explained below with reference to FIG. 4.

Figure 4:
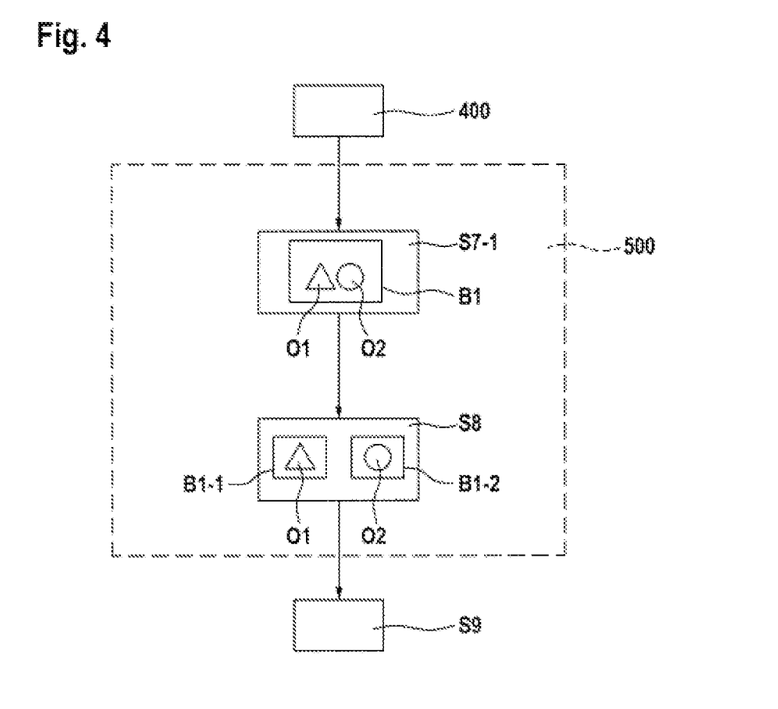
FIG. 4 illustrates a second aspect of a method for correcting image errors in a radiographic image as an independent method or advantageous further development of the method in FIG. 3.

FIG. 4 illustrates a second aspect of a method 500 for correcting image errors in a radiographic image. The method 500 may follow as a further development of the method 400 in FIG. 3, but may also be implemented independently without the method 400.

FIG. 4 relates to image errors according to the second scenario, in which multiple inspection objects O1, O2 have been captured, i.e., contained, in a single radiographic image B1. Since the result of the visual evaluation for an inspection object is generally associated with the particular radiographic image, this is not unequivocal when there are multiple inspection objects O1, O2 in the radiographic image B1. Therefore, an operator would have to reject the radiographic image B1 in the second scenario as well. The inspection objects O1, O2 in question would then have to be X-rayed again or manually rechecked. This results once again in the disadvantages at the control point in question, discussed above in conjunction with FIG. 3.

In the method 500 in FIG. 4, first it is recognized in step S7-1 whether the radiographic image B1 or optionally the combined radiographic image B23 contains multiple inspection objects, in the present case, O1, O2. In subsequent step S8, the radiographic image B1 is divided into resulting radiographic images B1-1, B1-2 in such a way that each resulting radiographic image B1-1, B1-2 contains only one of the multiple inspection objects O1, O2. In the example, the resulting image B1-1 is generated with inspection object O1, and the resulting image B1-2 is generated with inspection object O2.

Figure 5:
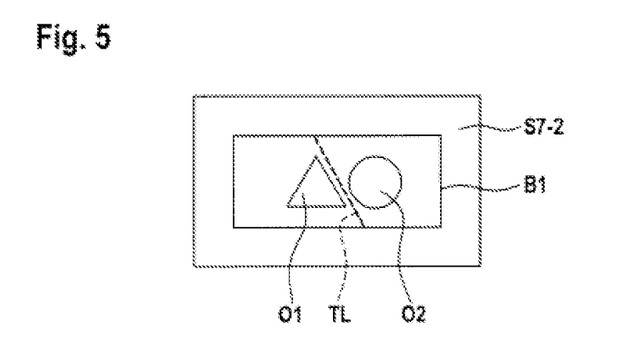
FIG. 5 illustrates one further development of the correction method in FIG. 4.

FIG. 5 illustrates one further development of the method 500 in FIG. 4. After step S7-1, the step S7-2 may be provided, in which in interaction with the operator of the evaluation unit 100, for example by placing a marker in the radiographic image B1, a separation curve, for example the separating line TL, is generated, along which the radiographic image B1 may be divided in order to generate the resulting radiographic images B1-1, B1-2, each of which contains only one of the multiple inspection objects O1, O2.

A step S9 may follow at the end of the method 500 in FIG. 4 and/or at the end of the method 400 in FIG. 3, in which a radiographic image that has not been corrected, or the combined radiographic image B23 or one of the resulting radiographic images B1-1 or B1-2, is displayed to the operator of the evaluation device 100 for visual evaluation. Alternatively or additionally, the radiographic image or the combined radiographic image B23 or the resulting radiographic images B1-1, B1-2 may be stored in step S9 for further or subsequent use.

It is noted that in step S2 of the method 400 and/or in step S7-1 of the method 500, the recognition of a correctable image error may take place automatically, for example via suitable image analysis methods implemented in the computer unit 110. For example, it may be automatically checked whether an inspection object is intersected by a leading or trailing image edge. This indicates that the inspection object is divided over at least two radiographic images. On the other hand, for example by analyzing the image background, it may be automatically recognized whether there are multiple separate inspection objects in the same radiographic image.

Alternatively or additionally, in step S2 and/or S7-1 an input may be requested from the operator, the input from the operator then indicating to the evaluation device 100 that the radiographic image B1 contains multiple inspection objects O1, O2, and/or the radiographic images B2, B3 each contain an incompletely captured inspection object O3.

The correction methods described in conjunction with FIGS. 3 through 5 may be implemented as a computer program product having a computer program. For this purpose, the computer program has software means for carrying out the correction methods described here when the computer program is executed on a computer, for example the computer unit 110 of the evaluation device 100 (FIG. 1). The computer program may be stored on a data medium magnetically, optically, magneto-optically, or in any other suitable manner. Alternatively, the computer program may be present in the form of a data stream, the data stream containing electronically readable control signals that can interact with a programmable computer in such a way that the computer carries out one of the correction methods described here.

Figure 6:
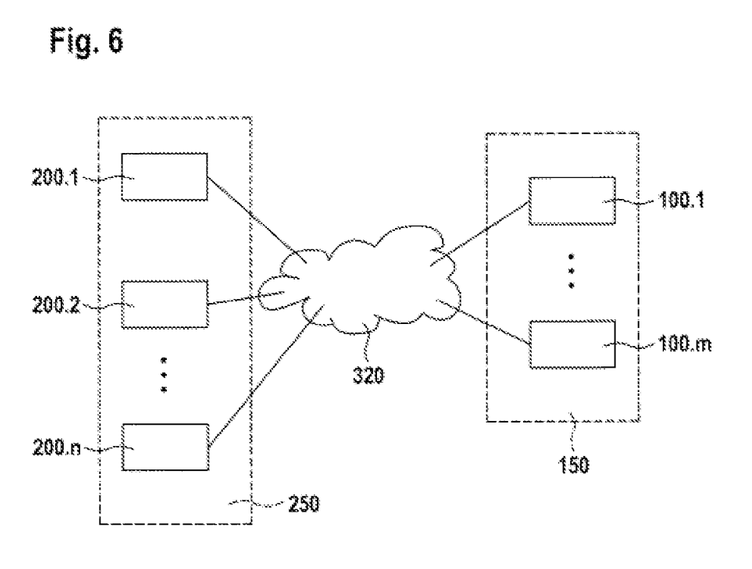
FIG. 6 shows an inspection system having multiple inspection appartuses at a control point, and multiple evaluation devices at an evaluation point that is situated in a spatially separate manner.

FIG. 6 shows an inspection system 300 having multiple (n) inspection apparatuses 200.1, 200.2, . . . , 200.n (see FIG. 1) at a control point 250, and multiple (m) evaluation devices 100.1, . . . , 100.m (see FIG. 1) at an evaluation point 150 that is situated in a spatially separate manner. The inspection apparatuses 200.1, 200.2, . . . , 200.n of the control point 250 are interconnected, via a data network 320, with the evaluation devices 100.1, . . . , 100.m of the evaluation point 150 in a manner known per se for electronic data exchange. Of course, multiple control points 250 may also be interconnected with one or likewise multiple evaluation points 150.

The control point 250 may be, for example, a checkpoint for access to a security area of an airport. At the checkpoint, the carry-on items of airline passengers are examined in a manner known per se by means of the inspection apparatuses 200.1, 200.2, ..., 200.n of the control point 250. In the exemplary embodiment, a radiographic image generated by one of the inspection apparatuses 200.1, 200.2, ..., 200.n is an X-ray image of one of the baggage items of one of the passengers. For the evaluation with respect to possible security risks or other objects of interest, the radiographic image is transmitted via the network 320 to one of the evaluation devices 100.1, ..., 100.m, where an operator visually examines the radiographic image.

If one of the image errors discussed here should occur during the generation of the radiographic images, this error may be corrected by means of the appropriate correction method 400 (FIG. 3) and/or 500 (FIG. 4). In this way, additional delays at the control point 250 are avoided, thus improving the overall screening process.

The invention claimed is:

1. A method for correcting image errors in a radiographic image, the method including:
   receiving a radiographic image of an inspection object, the radiographic image generated by an inspection apparatus configured for continuously transporting objects through the inspection apparatus for nondestructive inspection of the objects;
   recognizing whether the radiographic image contains only a portion of the inspection object;
   retrieving a further radiographic image of the inspection object based on recognition that the radiographic image contains only a portion of the inspection object, the further radiographic image generated by the inspection apparatus and containing a further portion of the inspection object; and
   combining the radiographic image with the further radiographic image to form a combined radiographic image.

2. The method according to claim 1, wherein retrieving a further radiographic image includes retrieving at least one of a preceding radiographic image or a subsequent radiographic image based on a determination that an image edge of the radiographic image intersects the inspection object.

3. The method according to claim 1, further including receiving a second radiographic image of the inspection object after the combined radiographic image is formed.

4. The method according to claim 1, further comprising:
   recognizing whether at least one of the radiographic image or the combined radiographic image contains multiple inspection objects;
   dividing the at least one of the radiographic image or the combined radiographic image based on the recognition of multiple inspection objects; and
   generating at least one resulting radiographic image from the divided at least one of the radiographic image or the combined radiographic image, each of the at least one resulting radiographic image containing only one of the multiple inspection objects.

5. The method according to claim 4, further comprising:
   defining a separating line, via placing a marker in the at least one of the radiographic image or the combined radio graphic image, along which the at least one of the radiographic image or the combined radiographic image is to be divided into the at least one resulting radiographic image.

6. The method according to claim 1, further comprising displaying at least one of the radiographic image or the combined radiographic image to an operator for visual evaluation.

7. The method according to claim 1, further comprising storing the at least one of the radiographic image or the combined radiographic image.

8. The method according to claim 1, wherein recognizing whether the radiographic image contains only a portion of the inspection object includes:
   recognizing automatically whether the radiographic image contains at least one of multiple inspection objects or an incompletely captured inspection object.

9. The method according to claim 1, wherein recognizing whether the radiographic image contains only a portion of the inspection object includes:
   requesting an input from an operator, the input indicating whether the radiographic image contains at least one of multiple inspection objects or an incompletely captured inspection object.

10. An evaluation device for visually evaluating radiographic images, the evaluation device comprising:
    a computer unit configured to execute programming to:
      receive at least one radiographic image of an inspection object, the at least one radiographic image generated by an inspection apparatus configured for continuously transporting objects through the inspection apparatus for nondestructive inspection of the objects;
      recognize whether the at least one radiographic image contains only a portion of the inspection object;
      retrieve a further radiographic image of the inspection object based on recognition that the radiographic image contains only a portion of the inspection object, the further radiographic image generated by the inspection apparatus and containing a further portion of the inspection object; and
      combine the at least one radiographic image with the further radiographic image to form a combined radiographic image;
    an output unit configured to display to an operator the at least one of the at least one radiographic image, the further radiographic image, or the combined radiographic image; and
    an input unit configured for receiving inputs from the operator in response to the displayed at least one of the at least one radiographic image, the further radiographic image, or the combined radiographic image.

11. The evaluation device according to claim 10, wherein the computer unit is further configured to execute programming to:
    recognize whether at least one of the at least one radiographic image or the combined radiographic image contains multiple inspection objects;
    divide the at least one of the at least one radiographic image or the combined radiographic image based on the recognition of multiple inspection objects; and
    generate at least one resulting radiographic image from the divided at least one of the at least one radiographic image or the combined radiographic image, each of the at least one resulting radiographic image containing only one of the multiple inspection objects.

12. The evaluation device according to claim 10, wherein the computer unit includes a communication interface for communicatively coupling the computer unit with at least one inspection apparatus, the communication interface configured for receiving the at least one radiographic image from the at least one inspection apparatus for visual evaluation.

13. The evaluation device according to claim 10, wherein the computer unit is further configured to execute programming to receive a second radiographic image of the inspection object after the combined radiographic image is formed.

14. The evaluation device according to claim 10, wherein the computer unit is further configured to execute programming to recognize whether the at least one radiographic image contains at least one of multiple inspection objects or an incompletely captured inspection object.

15. The evaluation device according to claim 10, wherein the computer unit is further configured to execute programming to request an input from an operator, the input indicating whether the at least one radiographic image contains at least one of multiple inspection objects or an incompletely captured inspection object.

16. An inspection system, comprising:
at least one inspection apparatus, the at least one inspection apparatus configured to generate at least one radiographic image of at least one inspection object;
an evaluation device communicatively coupled to the at least one inspection apparatus, the evaluation device configured to receive the at least one radiographic image from the at least one inspection device for a visual evaluation;
a computer unit configured to execute programming to:
receive the at least one radiographic image of an inspection object from the at least one inspection apparatus;
recognize whether the at least one radiographic image contains only a portion of the inspection object;
retrieve a further radiographic image of the inspection object based on recognition that the at least one radiographic image contains only a portion of the inspection object, the further radiographic image generated by the at least one inspection apparatus and containing a further portion of the inspection object; and
combine the at least one radiographic image with the further radiographic image to form a combined radiographic image;
an output unit configured to display to an operator the at least one of the at least one radiographic image, the further radiographic image or the combined radiographic image; and
an input unit configured for receiving inputs from the operator in response to the displayed the at least one of the at least one radiographic image, the further radiographic image or the combined radiographic image.

17. The inspection system according to claim 16, further comprising a communication interface for communicatively coupling the evaluation device with the at least one inspection apparatus.

18. The inspection system according to claim 16, wherein the computer unit is further configured to execute programming to:
recognize whether at least one of the at least one radiographic image or the combined radiographic image contains multiple inspection objects;
divide the at least one of the at least one radiographic image or the combined radiographic image based on the recognition of multiple inspection objects; and
generate at least one resulting radiographic image from the divided at least one of the at least one radiographic image or the combined radiographic image, each of the at least one resulting radiographic image containing only one of the multiple inspection objects.

19. The inspection system according to claim 16, wherein the computer unit is further configured to execute programming to receive a second radiographic image of the inspection object after the combined radiographic image is formed.

20. The inspection system according to claim 16, wherein the computer unit is further configured to execute programming to recognize whether the at least one radiographic image contains at least one of multiple inspection objects or an incompletely captured inspection object.

* * * * *